Figure 1:
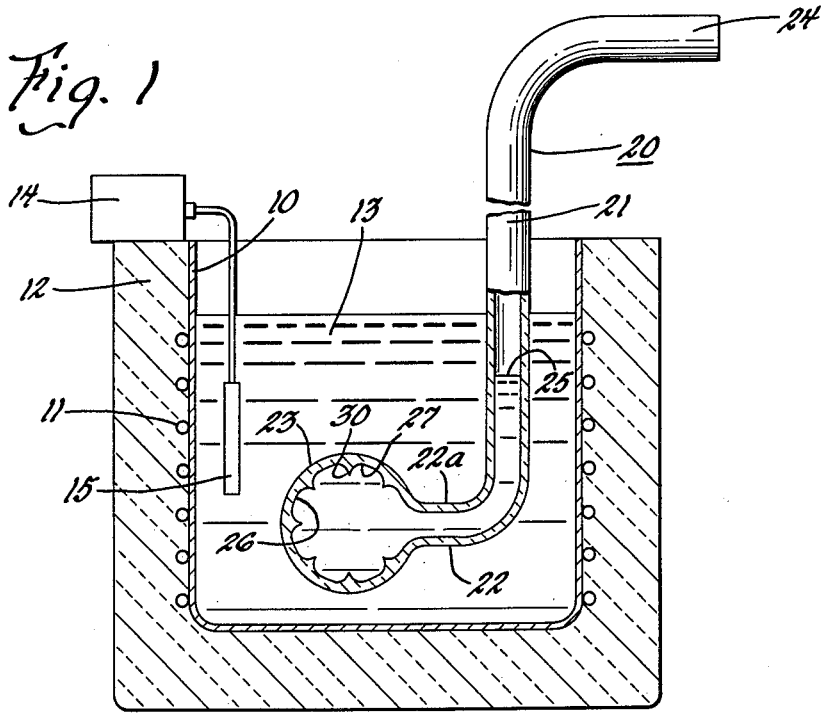

Oct. 22, 1963    F. J. MARKEY    3,107,516
LIQUID VAPORIZATION TESTING APPARATUS
Filed Sept. 19, 1960

INVENTOR.
Francis J. Markey
BY
D. C. Staley
HIS ATTORNEY

United States Patent Office 3,107,516
Patented Oct. 22, 1963

3,107,516
LIQUID VAPORIZATION TESTING APPARATUS
Francis J. Markey, Lewisburg, Ohio, assignor to General Motors Corporation, Detroit, Mich., a corporation of Delaware
Filed Sept. 19, 1960, Ser. No. 56,752
3 Claims. (Cl. 73—17)

This invention relates to an apparatus for testing liquids to determine whether or not they will vaporize below a predetermined elevated temperature, and particularly to an apparatus for checking the vaporization temperature of hydraulic brake fluids adapted for use in hydraulic brake systems for automobiles, to determine whether or not the brake fluid will vaporize below a predetermined desirable elevated temperature.

The matter of safety of hydraulic fluid used in hydraulic brake systems in automobiles is steadily becoming more important, and more critical as the braking requirements for automobiles increases in severity because of modern high speed driving and the weight of present day automobiles. Because of the modern day heavy duty brake requirement it is increasingly important that the vaporization temperature of a brake fluid used in an hydraulic brake system on an automobile be maintained at a relatively high elevated temperature to prevent spongy brake action resulting from vaporization of the brake fluid, and to prevent vapor lock in the hydraulic brake system.

There are on the market today hydraulic brake fluids for use in automotive brake systems that have a sufficiently high vaporization point, or boiling point, that under the severe brake operation required they will not vaporize so that a true hydraulic action is obtained in operating the brakes of an hydraulic brake system. One of the problems in hydraulic brake systems is that of maintaining the brake components containing the hydraulic brake fluid sufficiently cool that the temperature elevation of the component is not sufficient to result in vaporization of the hydraulic brake fluid contained within the component. However, even with the most careful engineering if a brake fluid having a low boiling point is placed in an hydraulic brake system, the brake fluid will most likely vaporize when severe brake operating conditions develop. Therefore, there is a necessity for means and apparatus to make a quick check of the vaporization or boiling point of the brake fluid in a brake system to determine whether or not its vaporization point is sufficiently high that it will not vaporize under normal operating conditions of the brake system, even when severe braking requirements develop.

To meet the modern day severe braking requirements, the manufacturers of hydraulic brake fluids have increased the boiling point or vaporization point of their fluids so that they will remain in liquid form at least to tempertaures in the neighborhood of 300° F. In fact many States have enacted laws making it unlawful to sell or distribute brake fluids that cannot meet a certain minimum boiling or vaporization point.

There are hydraulic brake fluids available on the commercial market that will meet minimum boiling point requirements of the laws of the several States, yet after the brake fluids are retained in an hydraulic brake system over a substantial period of time, the boiling point or vaporization point of the brake fluid is reduced by many factors one of which is the absorption of moisture by the brake fluid because of its hygroscopic character. It has been determined that if an hydraulic brake system is supplied with an hydraulic brake fluid having a boiling point of approximately 300° F., within one year's normal operating time the hydraulic brake fluid will have absorbed sufficient moisture as to reduce its boiling point substantially below 300° F. Therefore, it is desirable to have some kind of an apparatus that service or filling station attendants can use to make a quick check of the boiling point of brake fluids in use in automobiles to warn the driver of the vehicle when the boiling point of the fluid in his vehicle is sufficiently low as to have been determined to be unsafe.

It is, therefore, an object of this invention to provide an apparatus that will be inexpensive to manufacture and will be simple and quick in use to make a check of the boiling point or vaporization point of brake fluid in an hydraulic brake system of an automobile while the driver of the vehicle is in a service station and, in fact, to be able to make the vaporization check of the brake fluid during the time the service station attendant is filling the gasoline tank of the vehicle.

A further object of the invention is to provide a liquid vaporization testing device by which the operator of the service station can utilize a small portion of the brake fluid from the reservoir of an hydraulic brake system to make a visual check of the vaporization point of the hydraulic brake fluid while the owner of the vehicle is present, the device being constructed and arranged in a manner that the owner of the vehicle can visually see the vaporization of the brake fluid should it be one that will vaporize below a predetermined minimum vaporization temperature that has been determined to be a requirement for a safe hydraulic brake fluid.

Another object of the invention is to provide a liquid vaporization testing device that consists of a hollow stem member having an enlarged bulbous end at the lower end of the stem into which a small volume of hydraulic brake fluid is introduced so that when the bulbous end of the testing device is inserted into a liquid bath maintained at a predetermined elevated temperature, the liquid will vaporize if it is one of those having a vaporization temperature below that of the bath into which the device was inserted.

It is another object of the invention to provide a device of the character set forth in the foregoing objects wherein the enlarged bulbous end of the testing device is provided with projecting spine-like portions on the inside surface of the bulbous device to form points from which vaporization will initiate rather than having the entire body of fluid elevated to a temperature and then suddenly vaporize in an explosive boiling action.

Further objects and advantages of the present invention will be apparent from the following description, reference being had to the accompanying drawings wherein a preferred embodiment of the present invention is clearly shown.

Figure 2:
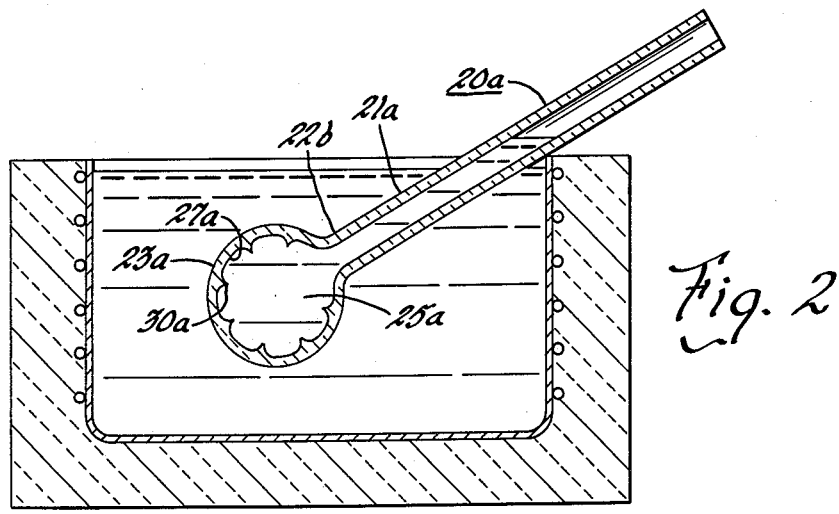
Figure 3:
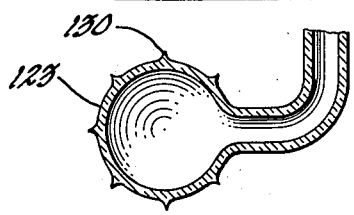

In the drawings:
FIGURE 1 is a vertical cross-sectional view through a liquid vaporization testing apparatus incorporating features of this invention.
FIGURE 2 is a vertical cross-sectional view through a modified form of liquid vaporization testing apparatus.
FIGURE 3 is a further modified arrangement of the liquid vaporization testing device illustrated in FIGURE 1.

In this invention the liquid vaporization testing apparatus consists of an open top container 10, preferably of metal, having a heating coil 11 placed in thermal contact with the container. A suitable heat insulating wall 12 is provided around the container.

The container 10 is adapted to be at least partially filled with a liquid bath 13 that is maintained at a predetermined elevated temperature by means of a thermostatically operated control switch 14 that is connected with the thermally sensitive element 15 disposed in the liquid bath 13. The control switch 14 is suitably connected with the heating element 11 to energize and de-energize the same in response to the temperature sensing element 15 operating a switch 14. Suitable electric current is controlled by the switch 14 to the heating element 11. The electric current may be obtained from a regular 115 volt A.C. supply source or it may be obtained from the battery of the vehicle, the heating coil 11 being adapted for one or the other of the sources of supply of electric current.

The liquid vaporization testing device 20 which is adapted to be used in connection with the heated liquid bath 13, consists of a hollow stem 21 that has the bottom end portion 22 terminating in an enlarged bulbous portion 23 that is also hollow and is in communication with the stem portion 21 through the hollow bottom end portion 22. The upper end of the stem 21 has the end portion 24 through which liquid is introduced into the stem 21 and thereby into the bulbous portion 23 when the testing device 20 is positioned horizontally with the bulbous end 23 depending downwardly from the stem 20, the end portion 24 thereby extending upwardly. In this position air can escape through the end portion 22 and thence through the stem portion 21 when liquid is filling the bulbous end portion 23.

When a small quantity of hydraulic brake fluid is supplied into the testing device 20, the fluid will completely fill the bulbous portion 23 and will extend upwardly into a portion of stem 21, as indicated by the liquid level 25 in the device 20. Device 20 is made of a suitable material which is sufficiently transparent or translucent to permit a direct visual observation and indication of the liquid level 25 in stem 21.

The bulbous end portion 23 has an interior surface 26 that has the upper portion 27 thereof positioned above the uppermost elevated portion 22a of the bottom end portion 22 so that the upper portion of the bulbous end 23 forms an entrapment chamber for any gases vaporized from the liquid contained within the bulbous end 23, it being understood that the testing device 20 is used in the position shown in FIGURE 1 when the device is used to test the vaporization or boiling point of an hydraulic brake fluid.

It will be noted that the axis of the bottom end portion 22 is radial from the bulbous end portion 23 and that the stem portion 21 has its axis angular to or normal to the axis of the end portion 22 so that when the device is placed in the position shown in FIGURE 1 liquid cannot escape from the bulbous end portion 23 except upwardly through the stem 21 of the testing device 20 as driven by any vapors or gases evolved from the hydraulic brake fluid contained in the bulbous portion 23 as heated by the bath 13 with the bulb 23 inserted into the heated bath.

The heated liquid bath 13 is maintained at a predetermined elevated temperature that has been determined to be the minimum at which the hydraulic brake fluid should vaporize or boil in order for the hydraulic brake fluid to be considered safe for use in an hydraulic brake system for an automotive vehicle. Thus, when a small volume of hydraulic brake fluid is removed from the reservoir of an hydraulic brake system of an automotive vehicle and is placed in the testing device 20, if the hydraulic brake fluid does not vaporize when the testing device is inserted into the heated liquid bath, as shown in FIGURE 1, the hydraulic brake fluid thus tested will be a safe fluid for continued use in the hydraulic brake system.

However, should the hydraulic brake fluid placed into the testing device 20 vaporize at a temperature below the controlled temperature of the liquid bath 13, the vaporization of the hydraulic fluid indicates that it is no longer safe for use in an hydraulic brake system. This can readily be detected by the owner of the vehicle while the test is being made before him by the collection of vapor or gas in the upper portion 27 of the bulbous member 23 and which causes the fluid level 25 to rise in the stem 21 of the testing device thereby giving the operator of the vehicle a visual indication that gases are developing from the hydraulic brake fluid being tested below the temperature of the heated bath 13.

To prevent the hydraulic brake fluid introduced into the bulbous end 23 from producing an explosive boiling effect by sudden vaporization of the brake fluid when it rises to the vaporization temperature, the inside surface of the bulbous portion 23 is provided with a plurality of inwardly directed pointed projections 30, or spines, from the pointed end of which vaporization will initiate. The pointed ends of the projections 30 will tend to create hot spots which will cause initial vaporization at the ends of the spines or projections 30 before the main vaporization of the entire body of liquid in the bulbous member 23, the slight disturbance caused by the bubbles rising from the ends of the pointed projections 30 being sufficient to prevent explosive boiling or vaporization of the entire body of liquid in the bulbous end 23, which can occur in a quiescent body.

As shown in FIGURE 3, the spines or pointed projections 130 can be used on the exterior surface of the bulbous member 123 to create hot spots on the inside surface of the member 123. However, the arrangement illustrated in FIGURE 1 is preferable, since the bubbles can initiate on the points of the spines 30 for rising internally and provide for earlier vaporization at the points of the spines than would occur with the arrangement shown in FIGURE 3 where the bubble will have to break its surface tension from the inner surface of bulbous portion 123.

In FIGURE 2, there is illustrated a modified arrangement of the transparent vaporization testing device 20a wherein the stem 21a is a continuous straight piece terminating at its bottom end portion 22b in the enlarged bulbous end 23a that is similar to the bulbous end 23 of FIGURE 1, having the internally directed spines or pointed projections 30a.

In the device shown in FIGURE 2 it will be noted that the upper portion 27a of the bulbous portion 23 is vertically above the most elevated portion of the bottom end portion 22b so that the portion 27a of the enlarged bulbous end 23a forms an entrapment chamber for gases evolved from the liquid body 25a contained within the bulb portion 23a. In operation the device of FIGURE 2 functions in the same manner as the device of FIGURE 1.

Preferably, the bulbous end portions 23 and 23a of the vaporization testing devices 20 and 20a are in the form of spheres but of course other configurations can be used for the bulbous end portions providing the upper portions 27 and 27a remain above the most elevated portion of the bottom end of the stem portions 21 and 21a, as indicated in FIGURES 1 and 2 to form entrapment chambers for gases evolved from liquid placed within the testing devices so that the evolved gases will cause a rise in the liquid level in the stem of the testing device to give a visual indication of the fact that vapors are evolving from the liquid contained in the testing device.

While the embodiment of the present invention as herein disclosed, constitutes a preferred form, it is to be understood that other forms might be adopted.

What is claimed is as follows:

1. Liquid vaporization testing apparatus comprising, a fluid bath maintained at a predetermined temperature at which a liquid is to be tested for vaporization, and a heat conductive liquid retaining vapor entrapment and liquid displaceable device positionable in said bath in heat transfer relation therewith to elevate the temperature of test liquid contained in the device to said predetermined bath temperature and vaporize test liquid therein if the vaporization temperature of the test liquid is below that of the predetermined bath temperature, said device having a hollow transparent stem to provide a visual indication and an enlarged closed hollow bulbous end portion at the bottom end of said stem, said bottom end portion of said stem being in fluid flow connection with said bulbous end portion to conduct test liquid into said bulbous end portion introduced through said stem and when positioned vertically providing for the complete escape of air from said bulbous end portion during test liquid filling thereof, said bulbous end portion having an interior wall surface at least partly disposed vertically above the most elevated portion of said stem bottom end portion with said stem positioned in the test conducting position angularly away from a vertical position to form thereby a vapor entrapment chamber in said bulbous end portion above the uppermost level of said stem bottom end portion for collecting vapor from test liquid filling said bulbous end portion at a vapor pressure and displacing a portion of the test liquid into said stem when the vaporization temperature of the test liquid is below that of the bath predetermined temperature, said bulbous end portion having a plurality of hot spot creating projections extending from one surface thereof from which test liquid vaporization is initiated when the test liquid vaporization is below the bath predetermined temperature.

2. The testing apparatus of claim 1, said hot spot creating projections extending from the inner surface of said bulbous end portion.

3. The testing apparatus of claim 1, said hot spot creating projections formed with tapered point extreme ends extending from the inner surface of said bulbous end portion and providing vapor bubble initiating points.

References Cited in the file of this patent

UNITED STATES PATENTS

| | | |
|---|---|---|
| 2,261,235 | Doelling | May 13, 1940 |
| 2,407,226 | Doelling | Sept. 10, 1946 |

FOREIGN PATENTS

| | | |
|---|---|---|
| 1,067,407 | Germany | Oct. 22, 1959 |

OTHER REFERENCES

"Developments," published by Cole-Parmer (Chicago), March 1957.